(12) United States Patent
Strobl

(10) Patent No.: US 7,116,018 B2
(45) Date of Patent: Oct. 3, 2006

(54) ELECTRIC MOTOR

(75) Inventor: Georg Strobl, Tai Po (HK)

(73) Assignee: Johnson Electric S.A., La Chaux-de Fonds (CH)

( * ) Notice: Subject to any disclaimer, the term of this patent is extended or adjusted under 35 U.S.C. 154(b) by 210 days.

(21) Appl. No.: 10/797,027

(22) Filed: Mar. 11, 2004

(65) Prior Publication Data

US 2004/0183383 A1    Sep. 23, 2004

(30) Foreign Application Priority Data

Mar. 18, 2003   (GB)   ................................ 0306077.9

(51) Int. Cl.
*H02K 33/18* (2006.01)

(52) U.S. Cl. ........................................................ 310/36

(58) Field of Classification Search ............. 310/36–39
See application file for complete search history.

(56) References Cited

U.S. PATENT DOCUMENTS

| | | | |
|---|---|---|---|
| 3,343,012 A | 9/1967 | Scott ........................... 310/36 |
| 3,483,410 A * | 12/1969 | Lencioni, Jr. et al. ...... 310/114 |
| 4,595,849 A | 6/1986 | Cuenoud ....................... 310/36 |
| 4,626,717 A | 12/1986 | Hensing et al. ............... 310/36 |
| 5,018,369 A * | 5/1991 | Lonati ............................ 66/40 |
| 6,870,295 B1 * | 3/2005 | Lim et al. ................... 310/216 |

* cited by examiner

*Primary Examiner*—Karl Tamai
*Assistant Examiner*—Judson H. Jones
(74) *Attorney, Agent, or Firm*—Young & Thompson

(57) ABSTRACT

An oscillating motor has a rotor rotation of about ±15° from a rest position. The rotor has two salient poles which face a respective permanent magnet across a small air gap. The stator has a laminated stator core supporting the magnets and also two salient poles each supporting a stator coil. The stator poles confront the rotor across a small air gap between the rotor poles. When no current is flowing through the coils, the rotor rests in a rest position with the poles aligned between the north and south poles of the magnets. During operations, the stator coils induce like magnetic poles in the stator poles which in turn induce like magnetic poles in the rotor poles causing the rotor to swing towards opposite magnetic poles of the permanent magnets. When current flows in the reverse direction, the rotor swings to the opposite poles of the magnets.

20 Claims, 2 Drawing Sheets

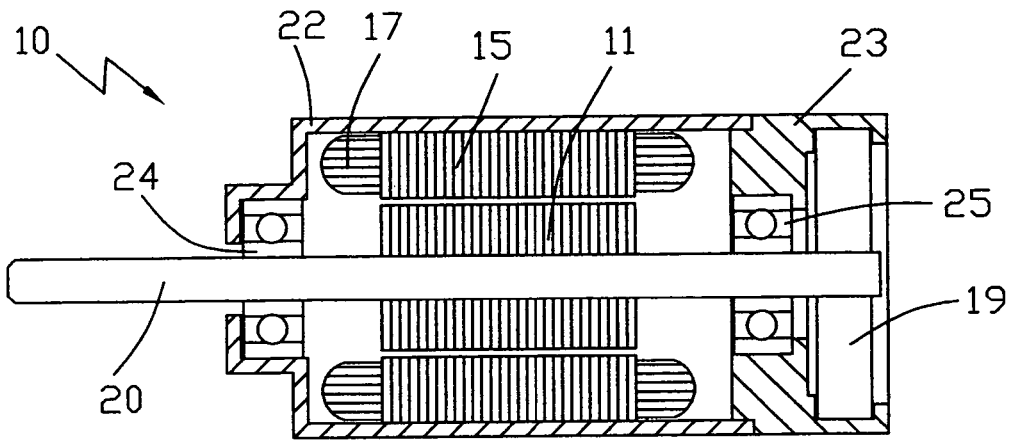
FIG. 3
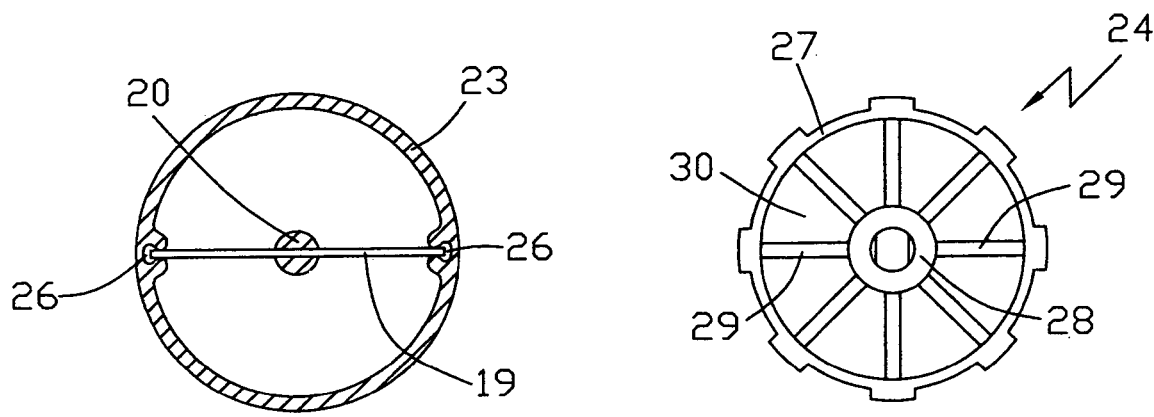
FIG. 4
FIG. 6
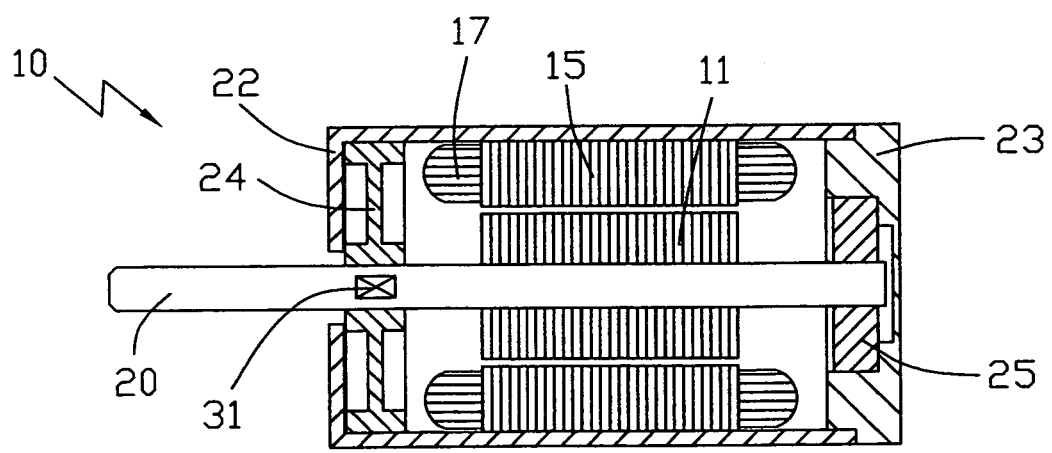
FIG. 5

ELECTRIC MOTOR

BACKGROUND OF THE INVENTION

This invention relates to an oscillating electric motor and in particular, to a miniature oscillating motor suitable for use in portable battery powered appliances.

DESCRIPTION OF THE RELATED ART

Oscillating motors are devices which look like a motor in that they have an output shaft extending from a housing. However, the output shaft does not fully rotate but instead oscillates back and forth through a limited range of movement of less than one revolution, often though only a few degrees, for example, 30° or 60°.

U.S. Pat. No. 4,595,849 shows such a motor for use in an electric toothbrush. The motor has a permanent magnet rotor and a return spring for biasing the rotor to a rest position. A flywheel is fitted to the motor shaft to fine tune the resonance frequency of the rotor so that resonance occurs at operating frequency.

SUMMARY OF THE INVENTION

There is a need for an oscillating motor which is simple in construction, reliable and is easy to mass produce.

Accordingly, the present invention provides an oscillating motor comprising a shaft; a laminated rotor core fitted to the shaft, the rotor core having at least one salient pole; a laminated stator core having at least one salient pole; at least one stator coil wound about the stator pole; at least one permanent magnet fitted to the stator core located circumferentially spaced from the stator pole and facing the rotor pole across an air gap, the permanent magnet having two circumferentially spaced magnetic poles; whereby alternating current flowing through the stator coil causes the rotor pole to swing between the poles of the permanent magnet.

Preferably, the rotor core has two salient poles; the stator core has two salient poles, each stator pole having a respective stator coil; there are two permanent magnets fitted to the stator core respectively located circumferentially between the stator poles and respectively facing the rotor poles across an air gap; wherein the stator coils are wound to induce like magnetic poles in the stator poles which in turn induce like magnetic poles in the rotor poles.

Preferably, the rotor is biased to a rest position by a return spring.

Preferably, the or each permanent magnet is composed of a number of separate smaller permanent magnet pieces.

Preferably, the bearings are bushings with a shaft interface surface of self lubricating or low friction material.

Preferably, one of the bearings is a special bearing which provides a spring function to urge the shaft into a predetermined orientation.

Preferably, the shaft oscillates in an angular range between ±5° and ±20°, preferably between ±5° and ±10°.

BRIEF DESCRIPTION OF THE DRAWINGS

Preferred embodiments of the invention will now be described with reference to the accompanying drawings, in which:

FIG. 3 is a longitudinal sectional view similar to FIG. 2 of a modified motor;

FIG. 4 is cross sectional view of an end cap of the motor of FIG. 3;

FIG. 5 is a longitudinal sectional view similar to FIG. 2 of a further modified motor; and FIG. 6 is a elevational view of a seal bearing as used in the motor of FIG. 5.

DESCRIPTION OF THE PREFERRED EMBODIMENTS

Figure 1:
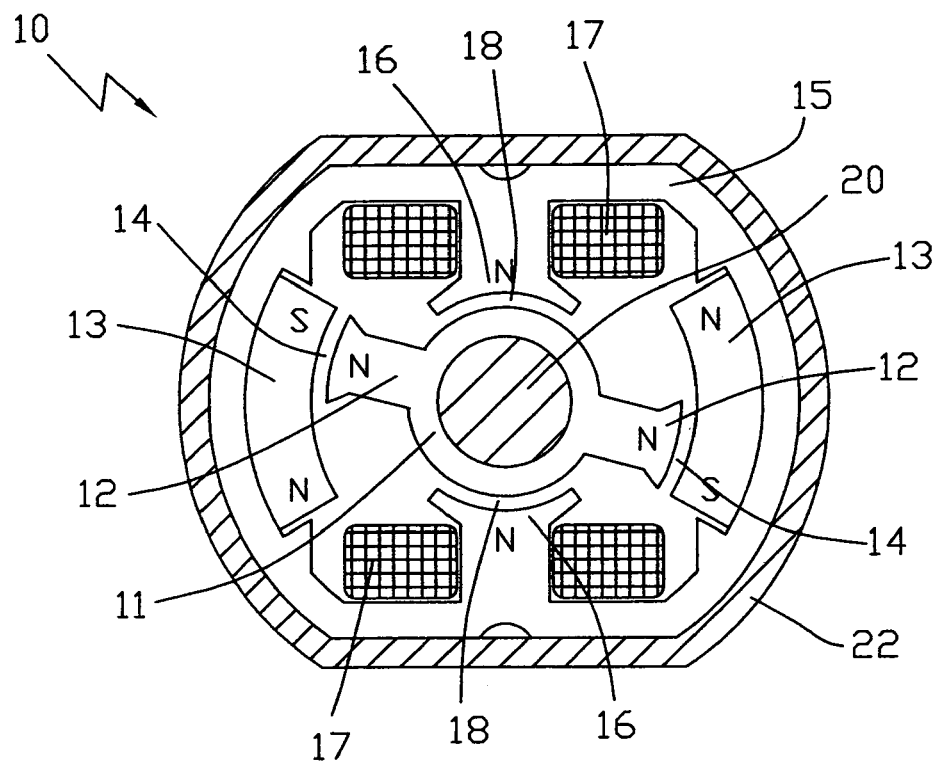
FIG. 1 is a cross-sectional view of a motor according to the preferred embodiment.

The oscillating motor of the preferred embodiment has a simple construction with an angular movement of ±15° from a spring biased neutral or rest position. FIG. 1 is a cross section through the middle of the motor showing the construction of the stator and rotor.

The rotor 11 comprises a laminated rotor core 21 with two salient poles 12 fitted to a motor shaft 20. There are no windings or magnets associated with the rotor 11. The stator has a ring type laminated stator core 15 having two salient stator poles 16. A stator coil 17 is wound around each stator pole 16. The stator also has two permanent magnets 13 circumferentially spaced between the stator poles 16 and located in confrontation with the rotor poles 12. The magnets 13 are magnetized laterally so as to have a N-pole and a S-pole next to each other as shown in FIG. 1 with the magnets arranged to provide a north pole and a south pole adjacent each stator pole 16.

The stator poles 16 face a body portion of the rotor core 21 across a small air gap 18 and the rotor poles 12 face the permanent magnets 13 across a small air gap 14 with the rotor being naturally biased by the magnets 13 to a neutral or rest position midway between the poles of the magnets which coincides with the middle of the magnets 13. The rotor 11 is also spring biased to the rest position. The function of this spring bias will be described in detail hereinafter.

Figure 2:
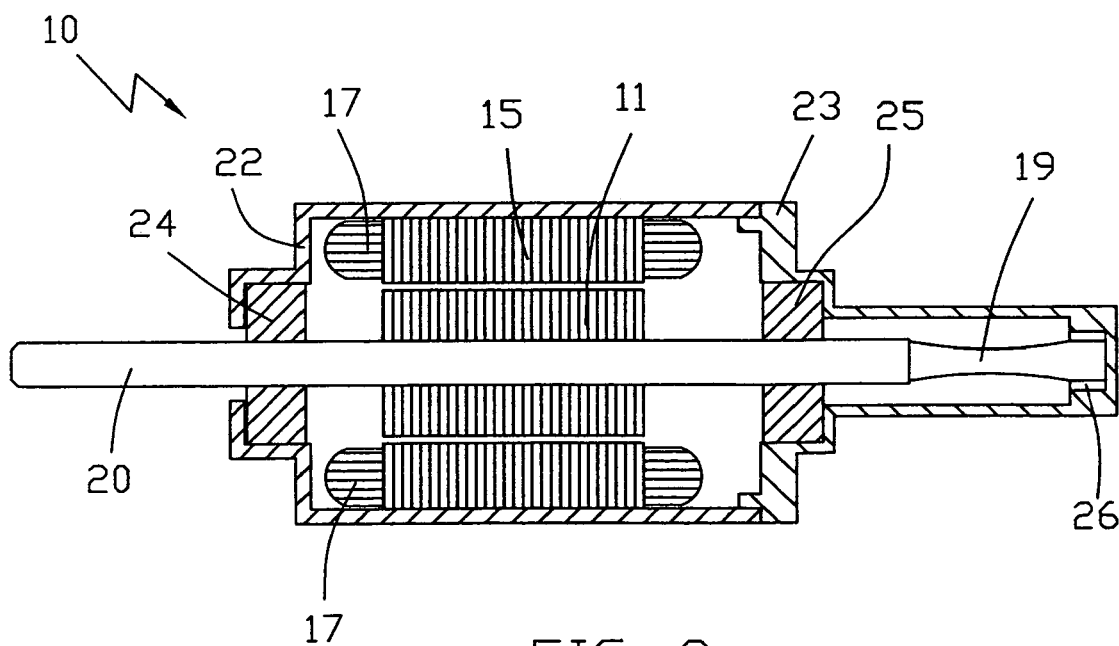
FIG. 2 is a longitudinal sectional view of the motor of FIG. 1.

As shown in FIG. 2, a plastic housing 22 covers the stator core 15. An end cap 23 closes off an open end of the housing. The shaft 20 is supported in bearings 24, 25 fitted to the housing 22 and the end cap 23. The end cap 23 also supports a torsion spring 19. The torsion spring 19 is a flat strip of spring steel secured in a slot in the end of the shaft 20. The spring 19 extends axially from the end of the shaft 20 and is located in a corresponding slot 26 of the end cap 23.

Operation of the motor will now be described. In the inactive state, the permanent magnets 13, assisted by the spring 19 returns or maintains the rotor 11 in its rest position in which the rotor poles 12 are equally attracted to both poles of the permanent magnets 13. When the motor is turned on current is passed through the stator coils 17 causing a magnetic field to be induced in the stator poles 16. Current in one direction produces a north magnetic pole to be formed on both stator poles 16. This in turn induces a north pole on both rotor poles 12 causing the rotor to swing toward the south poles of the magnets 13 as the forces of attraction between the south poles of the magnets and the north poles of the rotor and the forces of repulsion between the rotor north poles and the magnet north poles are greater than the restraining force of the spring 19 so that the rotor poles 12 are now aligned with the south poles of the magnets 13.

When current is fed through the stator coils in the opposite direction, a south magnetic pole is created in both stator poles 16 causing the rotor to swing in the opposite direction to align with the north poles of the magnets 13.

When no current is flowing through the coils 17, the stator poles 16 are no longer magnetized and there is no magnetic field induced in the rotor poles 12 and the rotor 11 returns to its rest position under the influence of the spring 19 and the permanent magnets 13.

By feeding alternating current through the stator coils 17, the rotor 11 swings from north poles to south poles and back, producing an continuous oscillating motion of the output shaft 20. It is envisaged that the a.c. supply would be provided by a battery driven electronic oscillator circuit.

The angle of oscillation can be predetermined with a maximum allowed movement set by physical constraints in the construction of the motor but the output range is of course dependent on the circumferential or arcuate extent of the permanent magnets 13, the strength or stiffness of the spring 19, the strength of the magnetic fields and the natural resonance frequency of the system and the operating frequency.

One preferred no load operating condition is a swing of ±15° at a resonance frequency between 150–350 Hz.

The motor operates most effectively when the operating frequency matches the resonance frequency of the rotating system. The resonance frequency is affected primarily by the mass of the rotor and any attachments thereon, the rotating mass. However, for certain applications such as toothbrushes and shavers, the desired output frequency may be above the resonance frequency of the rotating mass. The spring bias is used to adjust upwardly the resonance frequency of the rotating mass. It is thought that this occurs by increasing the acceleration of the rotor towards the rest position as the current is reversed in the stator coils. The faster the acceleration, the higher the resonance frequency. Thus by increasing the spring bias, e.g., by using a stiff spring, the resonance frequency of the motor is increased. By selecting an appropriate spring, the resonance frequency of the motor can be matched to the operating frequency to provide the greatest efficiency and thus the longest operating time per battery charge.

The bearings 24, 25 for the rotor must operate on only a small rotation in each direction and thus, oil impregnated sintered bearings, the bearing of choice for miniature electric motors, may not be suitable. Preferred bearings are the hard plastic bushings coated with self lubricating, or low friction material such as PTFE or NiPTFE, nylon bushings and/or ceramic bushings.

FIG. 3 shows a motor similar to that of FIG. 2 in which the bearings 24, 25 are ball bearings and the return spring 19 is in the form of a leaf spring placed radially instead of axially. The operating principle is the same. FIG. 4 is a cross sectional view of the inside of the end cap 23 of the motor of FIG. 3 to illustrate the arrangement of the return spring 19. The spring 19 is a flat strip of spring steel located in a slot in the end of the shaft 20. The spring 19 extends radially from the shaft 20 and both ends of the spring are located in respective recesses 26 in the end cap 23 in a manner to allow slight radial sliding of the spring while preventing the spring 19 from rotating with the shaft 20. Thus as the shaft 20 rotates the spring 19 is coiled or otherwise resiliently deformed creating a restoring force acting on the shaft 20 to return the rotor 11 to the rest position.

FIG. 5 illustrates a further modified motor similar to the motor of FIG. 2 in which the spring and bearing are combined into a single special bearing unit which also seals the end of the motor housing which is important for wet applications such as for use in an electric toothbrush or an electric shaver.

This special bearing unit referred to hereinafter as rubber bearing 24 is shown in FIG. 6. The rubber bearing 24 has an outer ring 27 for press fitting to the motor housing 22 or end cap 23 and an inner ring 28 for fitting onto the shaft 20. A number of ribs 29 extend between the inner and outer rings 28, 27 and provide radial support for the shaft 20. A web or rubber sheet 30 extends between each rib 29 and the inner and outer rings 28, 27 to seal the opening. The inner ring 28 is vulcanized to the shaft 20 to provide a good watertight seal and fixation. To give better grip or adhesion between the shaft 20 and the inner ring 28, the shaft 20 may be provided with a feature 31, such as flats, cuts or knurls. The inner ring may be similarly shaped. Thus, the inner ring 28 rotates with the shaft 20 and such rotation causes elastic distortion of the ribs 29 which provides the spring force required to modify the resonance frequency of the rotor and to bias the shaft 20 to the rest position.

This bearing arrangement is particularly attractive when the angle of oscillation is small, say in the order of ±5 to 10°. The material of the special bearing unit is preferably rubber or rubber like material especially silicone rubber with or without a metal or plastic insert.

The embodiments described above are given by way of example only and various modifications will be apparent to persons skilled in the art without departing from the spirit and scope of the invention as defined in the appended claims. For example, each permanent magnet may be made up of a number of separate permanent magnet pieces.

What is claimed is:

1. An oscillating motor comprising:
 a shaft;
 a laminated rotor core fitted to the shaft, the rotor core having at least one salient pole;
 a laminated stator core having at least one salient pole;
 at least one stator coil wound about the stator pole; and
 at least one permanent magnet fitted to the stator core located circumferentially spaced from the stator pole and facing the rotor pole across an air gap, the permanent magnet having two circumferentially spaced magnetic poles,
 wherein, alternating current flowing through the stator coil causes the rotor pole to swing between the poles of the permanent magnet, the motor operating as an oscillating motor under a resonance frequency.

2. The motor of claim 1 wherein the rotor core has two salient poles;
 the stator core has two salient poles, each stator pole having a respective stator coil;
 there are two permanent magnets fitted to the stator core respectively located circumferentially between the stator poles and respectively facing the rotor poles across an air gap;
 wherein the stator coils are wound to induce like magnetic poles in the stator poles which in turn induce like magnetic poles in the rotor poles.

3. The motor of claim 1 wherein the rotor is biased to a rest position by a return spring.

4. The motor of claim 3 wherein the return spring is a torsion spring in the form of a strip of spring steel attached at one end to the shaft and at another end to a stationary part of the motor.

5. The motor of claim 4 wherein the spring is located in a slot in the shaft, extends radially of the shaft and the ends of the spring are located in recesses in the end cap.

6. The motor of claim 1 wherein the salient poles of the rotor core and the stator core physically prevent full rotation of the rotor.

7. The motor of claim 1 wherein the motor has a cup shaped housing closed at one end by an end cap, the housing and end cap each supporting a bearing for rotationally supporting the shaft.

8. The motor of claim 7 wherein the bearings are bushings with a shaft interface surface of self lubricating or low friction material.

9. The motor of claim 8 wherein the low friction material is NiPTFE, PTFE, nylon or hard plastics.

10. The motor of claim 7 wherein one of the bearings is a special bearing which provides a spring function to urge the shaft into a predetermined orientation.

11. The motor of claim 10 wherein the special bearing also seals the shaft to the housing to prevent ingress of moisture.

12. The motor of claim 11 wherein the special bearing and the end cap seal the shaft to the housing.

13. The motor of claim 12 wherein the special bearing comprises an outer ring fixed to the housing or end cap, an inner ring fixed to the shaft for rotation therewith, a web extending between the inner and outer rings and a plurality of ribs extending between the inner and outer rings.

14. The motor of claim 13 wherein the special bearing is a single casting of a resiliently deformable material.

15. The motor of claim 14 wherein the material of the special bearing is selected from the group consisting of rubber, synthetic rubber, rubber like materials and silicone.

16. The motor of claim 13 wherein the special bearing is vulcanized to the motor shaft.

17. The motor of claim 1 wherein the motor is arranged to operate on an a.c. supply frequency of between 150 Hz to 350 Hz.

18. The motor of claim 1, wherein, there is exactly a single rotor fitted to the shaft.

19. An oscillating motor comprising
a shaft;
a laminated rotor core fitted to the shaft, the rotor core having at least one salient pole;
a laminated stator core having at least one salient pole;
at least one stator coil wound about the stator pole; and
at least one permanent magnet fitted to the stator core located circumferentially spaced from the stator pole and facing the rotor pole across an air gap, the permanent magnet having two circumferentially spaced magnetic poles;
whereby, alternating current flowing through the stator coil causes the rotor pole to swing between the poles of the permanent magnet,
wherein the rotor is biased to a rest position by a return spring,
wherein the return spring is a torsion spring in the form of a strip of spring steel attached at one end to the shaft and at another end to a stationary part of the motor, and
wherein the spring has a first end fixed in a slot in an end of the shaft and has a second end located in a slot in the end cap, with the spring extending in the axial direction of the shaft.

20. An oscillating motor comprising
a shaft;
a laminated rotor core fitted to the shaft, the rotor core having at least one salient pole;
a laminated stator core having at least one salient pole;
at least one stator coil wound about the stator pole;
at least one permanent magnet fitted to the stator core located circurnferentially spaced from the stator pole and facing the rotor pole across an air gap, the permanent magnet having two circumferentially spaced magnetic poles;
whereby alternating current flowing through the stator coil causes the rotor pole to swing between the poles of the permanent magnet,
wherein the shaft oscillates in an angular range between ±5° and ±20°, preferably between ±5° and ±10°.

* * * * *